US012766649B2

(12) United States Patent
El-Wardany et al.

(10) Patent No.: US 12,766,649 B2
(45) Date of Patent: Oct. 20, 2026

(54) SURFACE TREATING COMPONENT WITH VIBRATION ASSISTED ROLLING TOOL

(71) Applicant: RTX Corporation, Farmington, CT (US)

(72) Inventors: Tahany El-Wardany, Vernon, CT (US); Benjamin Bedard, Manchester, CT (US); Peter Wrabel, Windsor Locks, CT (US); Randy P. Salva, Baltic, CT (US); Sonia A. Martinez, Port Saint Lucie, FL (US); Joseph B. Wysocki, Somers, CT (US); Krzysztof Barnat, Berlin, CT (US); Stephen Gormley, Manchester, CT (US); Steven T. Holland, Glastonbury, CT (US); Andrew P. Frasca, Canton, CT (US)

(73) Assignee: RTX Corporation, Farmington, CT (US)

( * ) Notice: Subject to any disclaimer, the term of this patent is extended or adjusted under 35 U.S.C. 154(b) by 322 days.

(21) Appl. No.: 18/424,232

(22) Filed: Jan. 26, 2024

(65) Prior Publication Data

US 2025/0242396 A1 Jul. 31, 2025

(51) Int. Cl.

*B23P 9/04* (2006.01)
*B24B 39/00* (2006.01)
*C21D 7/08* (2006.01)

(52) U.S. Cl.

CPC ................ *B23P 9/04* (2013.01); *B24B 39/00* (2013.01); *C21D 7/08* (2013.01)

(58) Field of Classification Search

CPC . B23P 9/04; B24B 39/00; B24B 39/06; B24B 39/006

See application file for complete search history.

(56) References Cited

U.S. PATENT DOCUMENTS

| | | | | |
|---|---|---|---|---|
| 5,666,841 | A | 9/1997 | Seeger | |
| 10,786,883 | B2 | 9/2020 | Hawkes | |
| 11,136,635 | B2 * | 10/2021 | Gao | B23P 9/02 |
| 11,673,227 | B2 | 6/2023 | Kuczek | |
| 2018/0134370 | A1 * | 5/2018 | Lim | C21D 7/04 |
| 2018/0171447 | A1 | 6/2018 | Hawkes | |
| 2018/0171448 | A1 | 6/2018 | Hawkes | |
| 2024/0326182 | A1 | 10/2024 | Zhang | |

FOREIGN PATENT DOCUMENTS

CN 115369223 A * 11/2022 ............... C21D 7/08

OTHER PUBLICATIONS

English translation CN115369223 (Year: 2022).*

Tolga Bozdana A et al: "Deep cold rolling with ultrasonic vibrations—a new mechanical surface enhancement technique", International Journal of Machine Tools and Manufacture, Elsevier, Amsterdam, NL, vol. 45, No. 6, May 1, 2005 (May 1, 2005), pp. 713-718.

EP Search Report for EP Patent Application No. 25153965.6 dated Jul. 15, 2025.

* cited by examiner

*Primary Examiner* — Jason L Vaughan
*Assistant Examiner* — Amanda Kreiling
(74) *Attorney, Agent, or Firm* — Getz Balich LLC

(57) ABSTRACT

A method of operation is provided during which a tool is arranged with a surface of a component. The tool includes a roller contacting the surface. A rolling operation is performed on the surface using the roller. A vibration operation is performed on the surface through the roller concurrently with the performing of the rolling operation.

20 Claims, 4 Drawing Sheets

SURFACE TREATING COMPONENT WITH VIBRATION ASSISTED ROLLING TOOL

BACKGROUND OF THE DISCLOSURE

1. Technical Field

This disclosure relates generally to surface treating a component such as, for example, a thinned wall aero-space component.

2. Background Information

A surface of a component may be treated to impart compressive stresses within material of the component below the surface. Various systems and methods are known in the art for surface treating a component. While these known surface treatment systems and methods have various benefits, there is still room in the art for improvement.

SUMMARY OF THE DISCLOSURE

According to an aspect of the present disclosure, a method of operation is provided during which a tool is arranged with a surface of a component. The tool includes a roller contacting the surface. A rolling operation is performed on the surface using the roller. A vibration operation is performed on the surface through the roller concurrently with the performing of the rolling operation.

According to another aspect of the present disclosure, a method is provided for surface treating a component. During this method, compressive stresses are imparted within material of the component below a surface of the component. The imparting of the compressive stresses includes: applying a static pressure load against the surface of the component with a roller; rolling the roller along the surface as the static pressure load is applied against the surface of the component; and transmitting vibrations into the material of the component through the roller.

According to still another aspect of the present disclosure, a system is provided for surface treating a component. This system includes a tool, a manipulator and a transducer. The tool includes a roller. The roller is configured to contact a surface of the component. The manipulator is operatively coupled to the tool. The manipulator is configured to move the tool along the surface of the component such that the roller rolls along the surface of the component. The manipulator is configured to apply a static pressure load against the surface of the component through the roller. The transducer is operatively coupled to the tool. The transducer is configured to transmit vibrations into material of the component below the surface of the component through the roller.

The system may also include a controller. The controller may be configured to signal the manipulator to maintain the static pressure load as constant as the roller rolls along the surface of the component. The controller may also or alternatively be configured to change a frequency and/or an amplitude of the vibrations as the roller rolls along the surface of the component.

The system may also include a vibration generator electrically coupled to the transducer and remote from the tool.

The material may form a wall of the component with a thickness of the wall equal to or less than 0.20 inches.

The static pressure load may be constant as the roller rolls along the surface. A frequency of the vibrations may be automatically changed as the roller rolls along the surface.

The component may be an aircraft component.

The performing of the rolling operation and the performing of the vibration operation may collectively impart compressive stresses within material of the component adjacent the surface through a vibration-assisted rolling operation.

The performing of the rolling operation may include deep rolling the surface.

The performing of the rolling operation may include: applying a static pressure load against the surface with the roller; and moving the tool to roll the roller along the surface as the static pressure load is applied against the surface.

The static pressure load may be maintained constant as the tool moves along the surface.

The static pressure load may be varied as the tool moves along the surface.

The roller may contact a wall of the component forming the surface. The static pressure load may be changed based on a thickness of the wall.

The performing of the vibration operation may include transmitting vibrations into the component through the roller.

The vibrations may be ultrasonic vibrations.

The vibrations may be sub-ultrasonic vibrations.

A frequency of the vibrations may be maintained constant as the tool moves along the surface.

A frequency of the vibrations may be varied as the tool moves along the surface.

An amplitude of the vibrations may be defined based on a wall thickness and an applied deep rolling pressure of the roller onto the surface.

The surface may be a wall surface of a wall of the component. A thickness of the wall may be equal to or less than 0.25 inches.

The surface may be a wall surface of a wall of the component. A thickness of the wall may be equal to or less than 0.10 inches.

The component may be a component of an aircraft.

The component may be a component of a turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
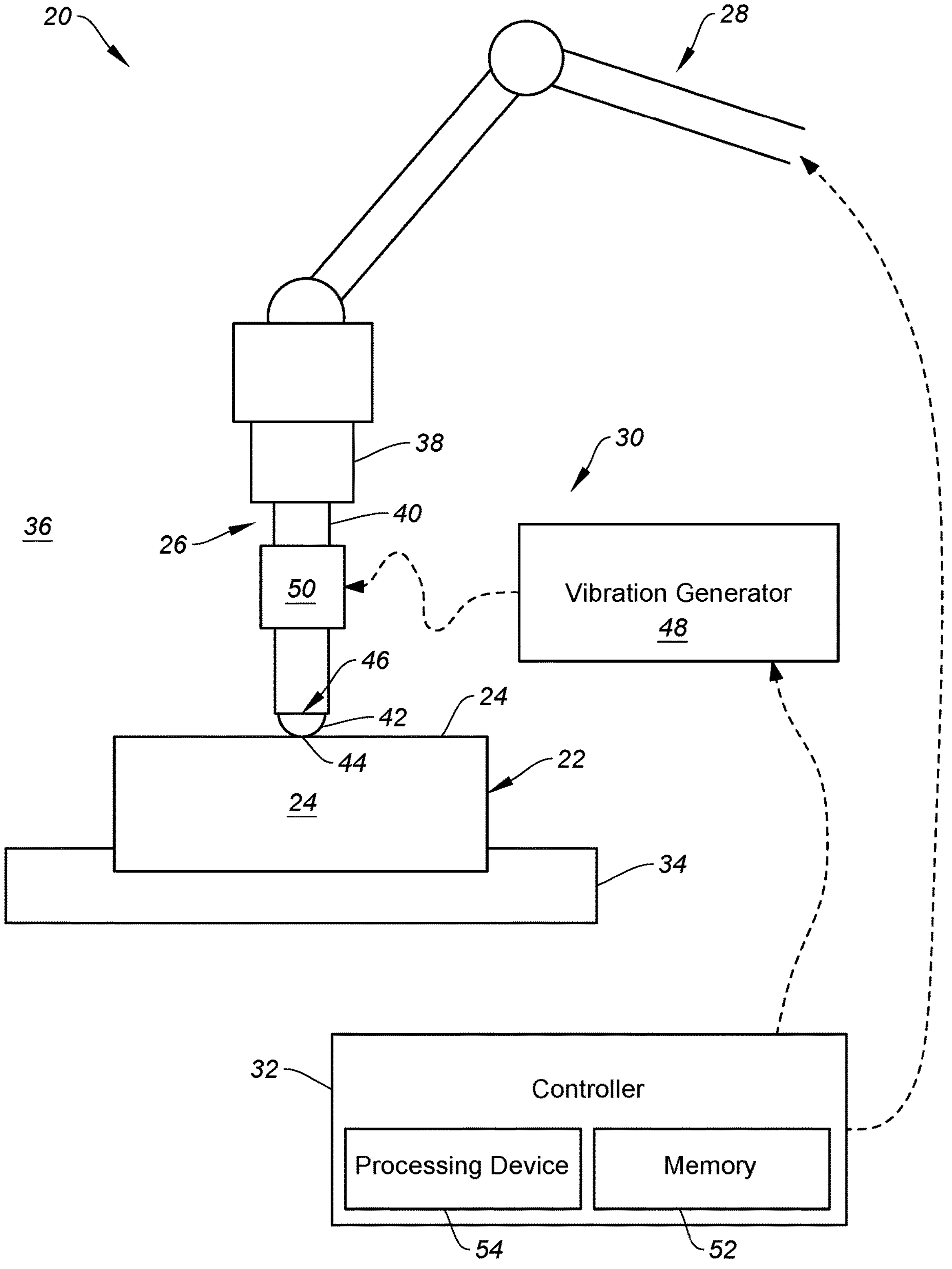
FIG. 1 is schematic illustration of a system for surface treating a component.

FIG. 1 illustrates a system 20 for surface treating a component 22; e.g., a metal aero-space component. This treatment system 20 is configured to impart compressive stresses within material 24 of the component 22 below and adjacent an exterior surface 26 of the component 22. The treatment system 20 includes a vibration assisted rolling tool 26, a manipulator 28, a vibration system 30 and a controller 32. The treatment system 20 of FIG. 1 also includes a fixture 34 for holding the component 22 within a workspace 36 during the surface treatment.

Figure 2:
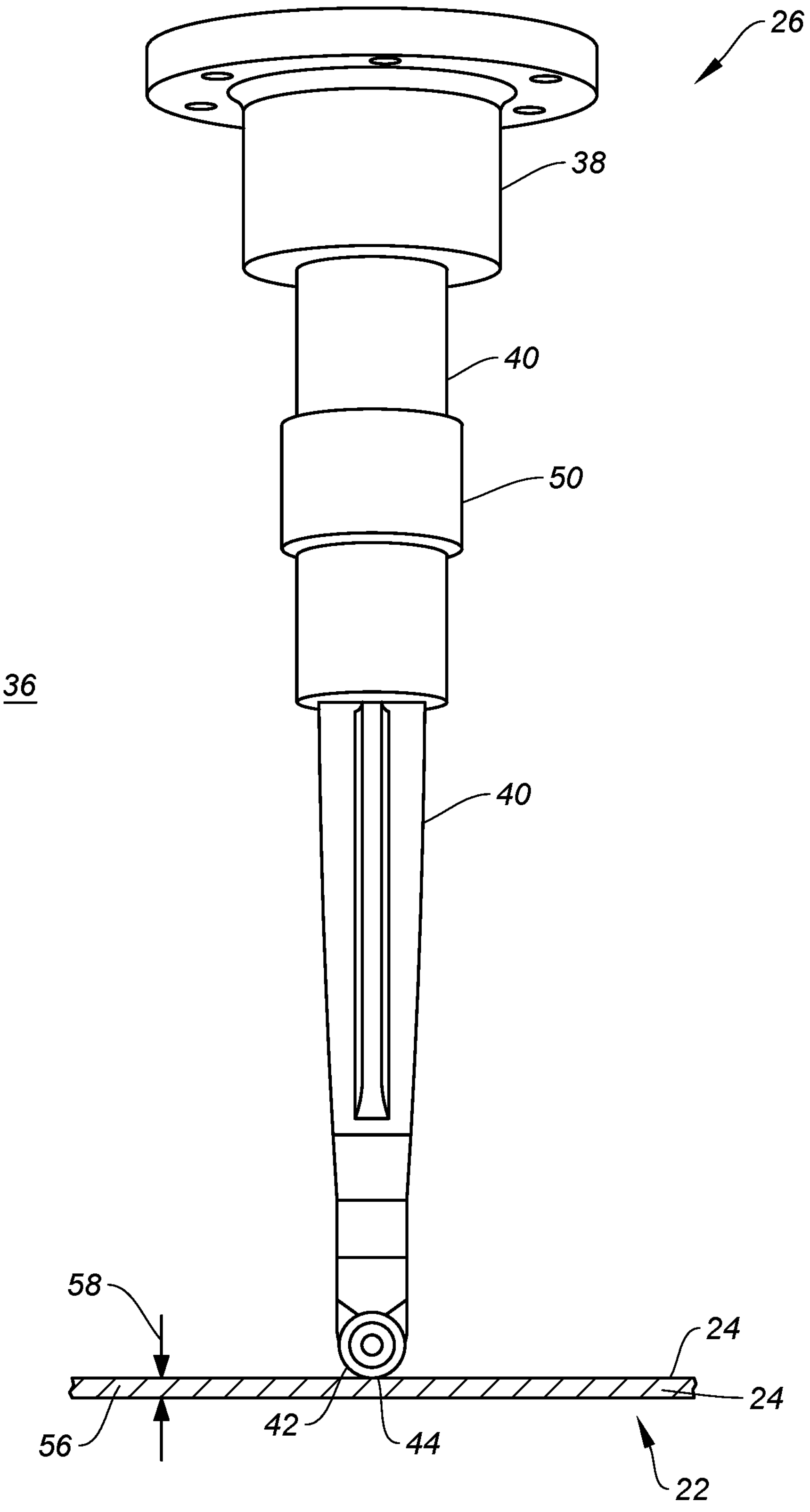
FIG. 2 is a perspective illustration of a vibration assisted rolling tool with a vibration transducer, where a roller of the vibration assisted rolling tool contacts a surface of the component.

Referring to FIG. 2, the vibration assisted rolling tool 26 includes a tool mount 38, a vibration generator tool 40 (e.g., a spiral flute horn) and a roller 42 (e.g., a crowned roller). The tool mount 38 is configured to attach the vibration assisted rolling tool 26 to a head of the manipulator 28 (see FIG. 1). The vibration generator tool 40 extends longitudinally along a centerline of the vibration assisted rolling tool 26 from the tool mount 38 towards a longitudinal distal end 44 of the vibration assisted rolling tool 26. The roller 42 is located at the distal end 44 of the vibration assisted rolling tool 26. The roller 42 is rotatably connected to the vibration generator tool 40 through a bearing; e.g., a journal bearing or a rolling element bearing. With this arrangement, the roller 42 is operable to rotate about a rotational axis 46 of the roller 42 (see FIG. 1). It should be noted, while an exemplary configuration of the vibration assisted rolling tool 26 is shown in FIG. 2, the present disclosure is not limited to such an exemplary configuration.

Referring to FIG. 1, the manipulator 28 is operatively coupled to the vibration assisted rolling tool 26 through the tool mount 38. The manipulator 28 is configured to move the vibration assisted rolling tool 26 within the workspace 36 relative to the component 22. The manipulator 28, for example, is configured to arrange the vibration assisted rolling tool 26 next to the component 22 such that the roller 42 engages (e.g., contacts) the component surface 24. The manipulator 28 is also configured to press the vibration assisted rolling tool 26 against the component 22. The manipulator 28, more particularly, is configured to apply a static pressure load against the component surface 24 through the vibration assisted rolling tool 26 and its roller 42. An example of the manipulator 28 is a multi-axis robot; e.g., a 6-axis robotic arm.

The vibration system 30 includes a vibration generator 48 (e.g., an oscillator) and a vibration transducer 50 electrically coupled to the vibration generator 48. The vibration transducer 50 is operatively coupled to the vibration assisted rolling tool 26; see also FIG. 2. The vibration transducer 50 of FIG. 1, for example, is operatively coupled to the vibration generator tool 40 at a location longitudinally between the tool mount 38 and the roller 42. The vibration transducer 50 is configured to transform an oscillating electrical signal generated by the vibration generator 48 into mechanical vibrations. The vibration transducer 50 is further configured to transmit the vibrations into the vibration generator tool 40. The vibration transducer 50 is thereby configured to transmit the vibrations into the material 24 of the component 22 through the vibration generator tool 40 and the roller 42.

The controller 32 is in signal communication (e.g., hardwired and/or wirelessly coupled) with the manipulator 28 and the vibration system 30. The controller 32 may be implemented with a combination of hardware and software. The hardware may include memory 52 and at least one processing device 54, which processing device 54 may include one or more single-core and/or multi-core processors. The hardware may also or alternatively include analog and/or digital circuitry other than that described above.

The memory 52 is configured to store software (e.g., program instructions) for execution by the processing device 54, which software execution may control and/or facilitate performance of one or more operations such as those described in the method below. The memory 52 may be a non-transitory computer readable medium. For example, the memory 52 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The fixture 34 may be configured to secure the component 22 in a known, stationary position during the surface treatment. The fixture 34, for example, may clamp or otherwise hold the component 22, and the fixture 34 may be mounted to a stationary base. It is contemplated, however, the fixture 34 may alternatively be mounted to another moveable device to facilitate movement (e.g., adjustment, positioning, etc.) of the component 22 within the workspace 36.

Figure 3:
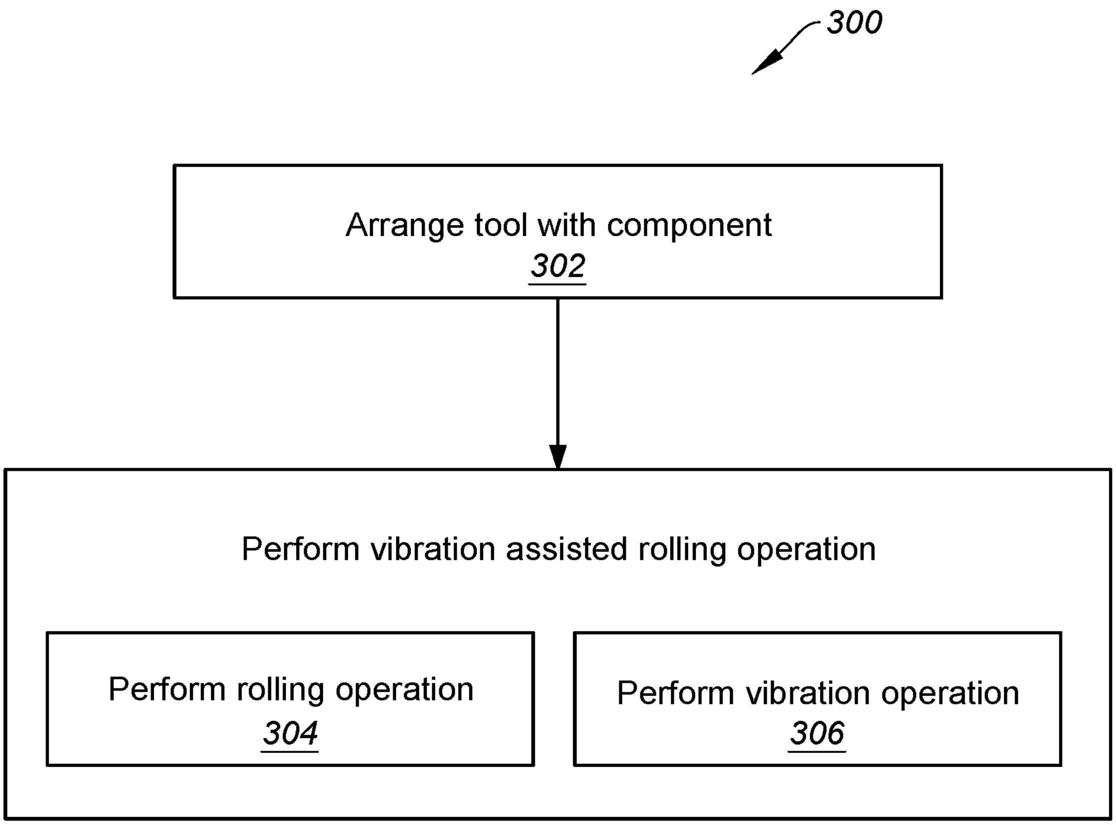
FIG. 3 is a flow diagram of a method for surface treating a component.

FIG. 3 is a flow diagram of a method 300 of operation for surface treating a component. For ease of description, the treatment method 300 is described below with reference to the treatment system 20 of FIG. 1. The treatment method 300 of the present disclosure, however, may alternatively be performed with other surface treatment systems.

In step 302, the vibration assisted rolling tool 26 is arranged with the component 22. The controller 32, for example, may signal the manipulator 28 to locate the vibration assisted rolling tool 26 next to the component 22 such that the roller 42 engages the component 22 and its component surface 24 to be treated.

In step 304, a rolling operation is performed on the component surface 24. The controller 32, for example, may signal the manipulator 28 to apply a static pressure load against the component 22 and its component surface 24 through the roller 42. For example, the manipulator 28 may press the vibration assisted rolling tool 26 longitudinally along the tool centerline (e.g., vertically) against the component 22. Concurrently, the controller 32 may signal the manipulator 28 to move the vibration assisted rolling tool 26 laterally along the component 22. The roller 42 may thereby roll along the component surface 24 while also applying the static pressure load. The rolling operation may thereby deep roll surface treat the material 24 of the component 22 beneath the component surface 24.

In step 306, a vibration operation is performed on the component surface 24. Note, while this vibration operation step 306 is described in a different step from the rolling operation step 304 for ease of description, the rolling operation step 304 and the vibration operation step 306 of the treatment method 300 are performed concurrently such that vibrations assist the rolling as described below in further detail. The controller 32, for example, may signal the vibration system 30 to generate vibrations. More particularly, the vibration generator 48 may generate an oscillating electrical signal and provide that oscillating electrical signal to the vibration transducer 50. The vibration transducer 50 may convert the oscillating electrical signal into mechanical vibrations and transmit those vibrations into the vibration generator tool 40. The vibrations are transmitted through the vibration generator tool 40 to the roller 42. The roller 42 transmits the vibrations into the material 24 of the component 22 beneath the component surface 24 as the roller 42 rolls along the component surface 24. The vibration operation may thereby vibration treat the material 24 of the component 22 beneath the component surface 24 during the rolling operation.

The concurrent performance of the rolling step 304 and the vibration step 306 (e.g., the assistance of the vibrations to the rolling) imparts compressive stresses within the material 24 of the component 22 along and beneath the component surface 24 being treated. The imparting of these compressive stresses may improve damage tolerance and/or a fatigue life of the component 22; e.g., by ten times (10×). While compressive stresses may be imparted using the rolling step 304 alone without the vibration step 206, the static pressure load applied during the rolling step 304 alone would need to be increased. For example, by pairing the rolling step 304 and the vibration step 306 as described above, the static pressure load may be reduced by two times (2×), five times (5×), ten times (10×) or even more compared to performance of the rolling step 304 without the vibration step 306. The treatment method 300 of the present disclosure therefore may be performed on components with relatively thin walls (e.g., sidewalls, floors, shrouds, etc.) without deforming a geometry of the walls. For example, referring to FIG. 2, a wall 56 of the component 22 carrying (e.g., forming) the component surface 24 may have a thickness 58 equal to or less than 0.25 inches (6.35 mm); e.g., equal to or less than 0.20 inches (5.08 mm), 0.10 inches (2.54 mm), or less. Here, the component material 24 is metal such as, but not limited to, steel, aluminum (Al) or an alloy thereof, titanium (Ti) or an alloy thereof, nickel (Ni) or an alloy thereof (e.g., Inconel®, Waspaloy®, etc.). The treatment method 300 of the present disclosure, however, is not limited to being performed on such thin-walled metal components. The treatment method 300, for example, may also be performed on a component with a wall thickness greater than 0.25 inches (6.35 mm).

Figure 4:
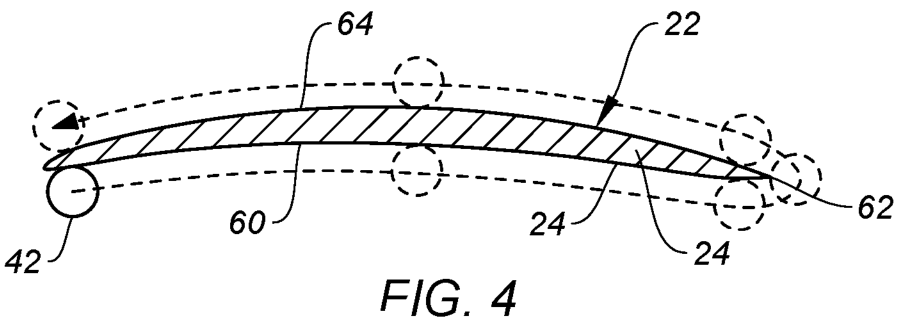
FIG. 4 is a sectional illustration of a component during a surface treatment operation.
Figure 5:
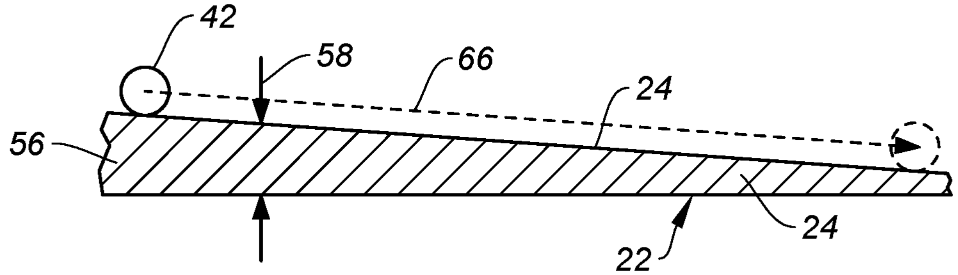
FIG. 5 is a sectional illustration of a portion of another component during a surface treatment operation.

In some embodiments, the static pressure load applied during the rolling step 304 may be maintained constant as the vibration assisted rolling tool 26 moves along the component surface 24. For example, referring to FIG. 4, the static pressure load may be maintained constant as the roller 42 rolls along part or an entirety of a first side 60 of the component 22, around an edge 62 of the component 22 (e.g., a leading or a trailing edge of an airfoil), and back along part or an entirety of a second side 64 of the component 22 opposite the first side 60. In other embodiments, the static pressure load applied during the rolling step 304 may be varied as the vibration assisted rolling tool 26 moves along the component surface 24. For example, referring to FIG. 5, the static pressure load may be changed based on the wall thickness 58. As the vibration assisted rolling tool 26 of FIG. 5 moves along the component 22 in a first direction 66 and the wall thickness 58 decreases, the static pressure load may be decreased. Of course, it is contemplated the static pressure load may alternatively be maintained as described above even as the wall thickness 58 changes.

In some embodiments, a frequency of the vibrations applied during the vibration step 306 may be maintained constant as the vibration assisted rolling tool 26 moves along the component surface 24. For example, referring to FIG. 4, the vibration frequency may be maintained constant as the roller 42 rolls along part or the entirety of the first side 60 of the component 22, around the edge 62 of the component 22, and back along part or the entirety of the second side 64 of the component 22. In other embodiments, the frequency of the vibrations applied during the vibration step 306 may be varied as the vibration assisted rolling tool 26 moves along the component surface 24. For example, referring to FIG. 5, the vibration frequency may be changed based on the wall thickness 58. As the vibration assisted rolling tool 26 of FIG. 5 moves along the component 22 in the first direction 66 and the wall thickness 58 decreases, the vibration frequency may be decreased. Of course, it is contemplated the vibration frequency may alternatively be maintained as described above even as the wall thickness 58 changes.

In some embodiments, both the static pressure load and the vibration frequency may be maintained constant during part or all of the surface treatment.

In some embodiments, both the static pressure load and the vibration frequency may be varied during part or all of the surface treatment. For example, both the static pressure load and the vibration frequency may be increased or decreased (e.g., in unison) during part or all of the surface treatment. In another example, the static pressure load may be increased and the vibration frequency may be decreased during part or all of the surface treatment. In still another example, the static pressure load may be decreased and the vibration frequency may be increased during part or all of the surface treatment.

In some embodiments, the static pressure load may be maintained constant and the vibration frequency may be varied during part or all of the surface treatment. In other embodiments, the static pressure load may be varied, and the vibration frequency may be maintained constant during part or all of the surface treatment.

In some embodiments, the vibrations may be ultrasonic vibrations. The vibration frequency, for example, may be equal to or greater than twenty kilohertz (20 kHz). For example, the vibrations may have an ultra-high frequency with a micron level amplitude. In other embodiments, the vibrations may be sub-ultrasonic vibrations. The vibrations, for example, may be acoustic vibrations where the vibration frequency is between twenty hertz (20 Hz) and twenty kilohertz (20 kHz). In another example, the vibrations may be infrasound vibrations where the vibration frequency is equal to or below twenty hertz (20 Hz).

The component 22 treated using the treatment system 20 and/or the treatment method 300 may have various configurations. The component 22, for example, may be configured as a component of an aircraft. The aircraft may be an airplane, a helicopter, a drone (e.g., an unmanned aerial vehicle (UAV)) or any other manned or unmanned aerial vehicle or system. The aircraft component may be a component of an aircraft airframe or a component of an aircraft engine; e.g., a gas turbine engine. Examples of the airframe component include, but are not limited to, a rib, a stringer, or a spar. Examples of the engine component include, but are not limited to, an engine case, a rotor blade (e.g., a fan blade, a compressor blade, a turbine blade, etc.), a stator vane (e.g., a fan exit guide vane, a compressor vane, a turbine vane, a nozzle vane, etc.), a flowpath wall, a shroud (e.g., a blade outer air seal (BOAS)), a rotor disk or hub, or an integrally bladed rotor. The present disclosure, however, is not limited to treating aircraft components, or aero-space component in general. The engine component, for example, may be utilized for a non-aerospace engine such as an industrial gas turbine engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure.

Accordingly, the present disclosure is not to be restricted except in light of the attached claims and their equivalents.

What is claimed is:

1. A system for surface treating a component, comprising:

a tool comprising a roller, the roller configured to contact a surface of a wall of the component;

a manipulator operatively coupled to the tool, the manipulator configured to move the tool along the surface of the component such that the roller rolls along the surface of the component, and the manipulator configured to apply a static pressure load against the surface of the component through the roller, wherein the manipulator is configured to vary the static pressure load in direct proportion to a thickness of the wall; and a transducer operatively coupled to the tool, the transducer configured to transmit vibrations into material of the component below the surface of the component through the roller.

2. The system of claim 1, further comprising a controller configured to change a frequency and/or an amplitude of the vibrations as the roller rolls along the surface of the component.

3. The system of claim 2, wherein the controller is configured to vary the frequency of the vibrations in direct proportion to the thickness of the wall.

4. The system of claim 1, further comprising a vibration generator electrically coupled to the transducer and remote from the tool.

5. A method of operation, comprising:

arranging a tool with a surface of a wall of a component, the tool comprising a roller contacting the surface;

performing a rolling operation on the surface using the roller; and performing a vibration operation on the surface through the roller concurrently with the performing of the rolling operation, wherein a vibration frequency of the vibration operation varies in direct proportion to a thickness of the wall.

6. The method of claim 5, wherein the performing of the rolling operation and the performing of the vibration operation collectively impart compressive stresses within material of the component adjacent the surface through a vibration-assisted rolling operation.

7. The method of claim 5, wherein the performing of the rolling operation comprises deep rolling the surface.

8. The method of claim 5, wherein the performing of the rolling operation includes applying a static pressure load against the surface with the roller; and moving the tool to roll the roller along the surface as the static pressure load is applied against the surface.

9. The method of claim 8, wherein the static pressure load is maintained constant as the tool moves along the surface.

10. The method of claim 8, wherein the static pressure load is varied as the tool moves along the surface.

11. The method of claim 8, wherein the static pressure load varies in direct proportion to the thickness of the wall.

12. The method of claim 5, wherein the performing of the vibration operation comprises transmitting vibrations into the component through the roller.

13. The method of claim 12, wherein an amplitude of the vibrations are defined based on the thickness of the wall and an applied deep rolling pressure of the roller onto the surface.

14. The method of claim 5, wherein the thickness of the wall is equal to or less than 0.25 inches.

15. The method of claim 5, wherein the thickness of the wall is equal to or less than 0.10 inches.

16. The method of claim 5, wherein the component comprises a component of an aircraft.

17. The method of claim 5, wherein the component comprises a component of a turbine engine.

18. A method for surface treating a component, comprising:

imparting compressive stresses within material of the component below a surface of the component, the imparting of the compressive stresses including applying a static pressure load against the surface of the component with a roller, wherein the roller contacts a wall of the component forming the surface;

rolling the roller along the surface as the static pressure load is applied against the surface of the component, wherein the static pressure load varies in direct proportion to a thickness of the wall; and transmitting vibrations into the material of the component through the roller.

19. The method of claim 18, wherein a frequency of the vibrations is automatically changed as the roller rolls along the surface.

20. The method of claim 18, wherein a frequency of the vibrations varies in direct proportion to the thickness of the wall.

* * * * *